(12) United States Patent
Walker

(10) Patent No.: US 7,865,464 B2
(45) Date of Patent: Jan. 4, 2011

(54) SYSTEMS AND METHODS FOR NOTIFYING MULTIPLE SYSTEMS AND APPLICATIONS OF CHANGES TO DATA ATTRIBUTES

(75) Inventor: Douglas Jock Walker, Springville, UT (US)

(73) Assignee: PresenceID, Inc., Salt Lake City, UT (US)

(*) Notice: Subject to any disclaimer, the term of this patent is extended or adjusted under 35 U.S.C. 154(b) by 308 days.

(21) Appl. No.: 11/833,857

(22) Filed: Aug. 3, 2007

(65) Prior Publication Data

US 2008/0082989 A1  Apr. 3, 2008

Related U.S. Application Data

(60) Provisional application No. 60/827,632, filed on Sep. 29, 2006.

(51) Int. Cl.
*G06F 17/00* (2006.01)

(52) U.S. Cl. .................. 707/612; 707/635

(58) Field of Classification Search .............. None
See application file for complete search history.

(56) References Cited

U.S. PATENT DOCUMENTS

| | | | |
|---|---|---|---|
| 5,499,358 A | 3/1996 | Nevarez | |
| 5,608,903 A | 3/1997 | Prasad et al. | |
| 5,742,820 A | 4/1998 | Perlman et al. | |
| 5,758,344 A | 5/1998 | Prasad et al. | |
| 5,794,232 A | 8/1998 | Mahlum et al. | |
| 5,818,936 A | 10/1998 | Mashayekhi | |
| 5,893,118 A | 4/1999 | Sonderegger | |
| 5,933,826 A | 8/1999 | Ferguson | |
| 6,105,062 A | 8/2000 | Andrews et al. | |
| 6,192,405 B1 | 2/2001 | Bunnell | |
| 6,438,594 B1 | 8/2002 | Bowman-Amuah | |
| 6,442,748 B1 | 8/2002 | Bowman-Amuah | |
| 6,446,253 B1 | 9/2002 | Mellmer | |
| 6,539,396 B1 | 3/2003 | Bowman-Amuah | |
| 6,601,234 B1 | 7/2003 | Bowman-Amuah | |
| 6,871,232 B2 | 3/2005 | Curie et al. | |
| 6,981,043 B2* | 12/2005 | Botz et al. | 709/225 |
| 6,993,508 B1 | 1/2006 | Major et al. | |
| 7,080,077 B2 | 7/2006 | Ramamurthy et al. | |
| 7,085,834 B2 | 8/2006 | Delany et al. | |
| 7,099,871 B2 | 8/2006 | Faybishenko et al. | |
| 7,103,676 B2 | 9/2006 | Payrits et al. | |
| 7,107,610 B2 | 9/2006 | Lortz | |
| 7,111,297 B1 | 9/2006 | Sankaranarayan et al. | |
| 7,113,994 B1 | 9/2006 | Swift et al. | |
| 7,114,037 B2 | 9/2006 | Agarwal et al. | |
| 2003/0088576 A1 | 5/2003 | Hattori et al. | |
| 2003/0105634 A1 | 6/2003 | Abella et al. | |
| 2004/0010665 A1* | 1/2004 | Agarwal et al. | 711/154 |
| 2005/0086285 A1* | 4/2005 | Balasubramanian et al. | 709/200 |

* cited by examiner

*Primary Examiner*—Tim T. Vo
*Assistant Examiner*—Aaron Sanders
(74) *Attorney, Agent, or Firm*—Austin Rapp & Hardman

(57) ABSTRACT

A system for managing changes to identity data is described. A first spoke managing system is described which includes a first database, a first application in communication with the first database, and a first spoke manager in communication with the first application. A first message is generated including a plurality of common data attributes. The first message is sent to the hub managing system. The hub managing system includes a hub manager. The first message including the plurality of common data attributes is received from the first spoke managing system. A plurality of common data attributes are updated. A determination is made if a unique data attribute that uniquely identifies a reference object is being updated. A second message is generated based on the determination. A third message is generated based on the updates of the plurality of common data attributes. The second message and third message are sent.

16 Claims, 8 Drawing Sheets

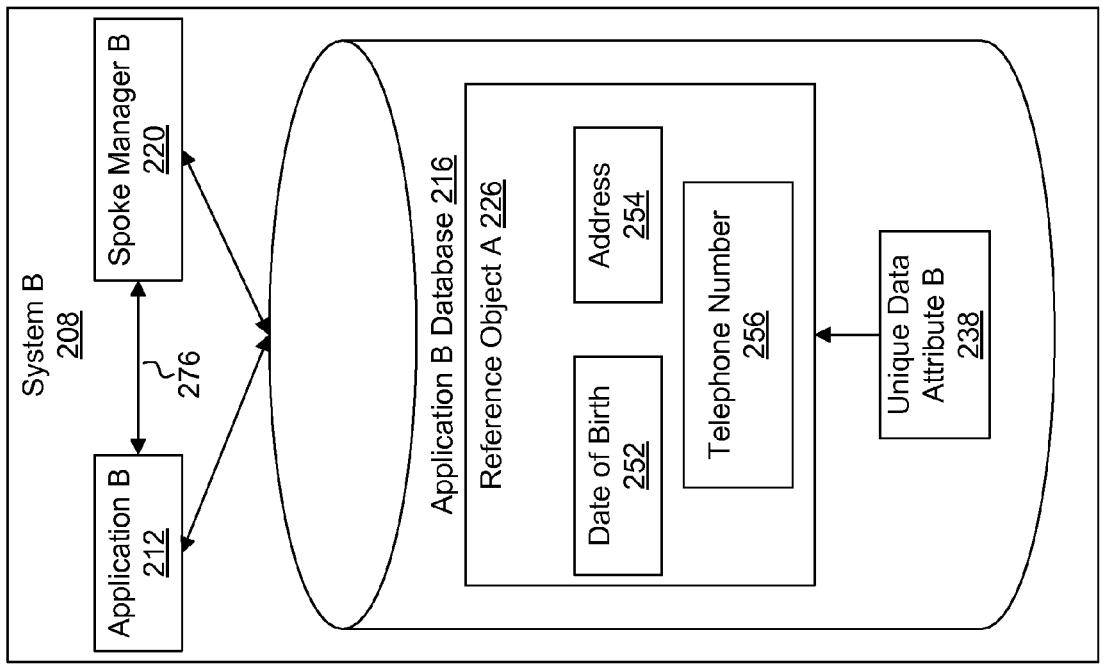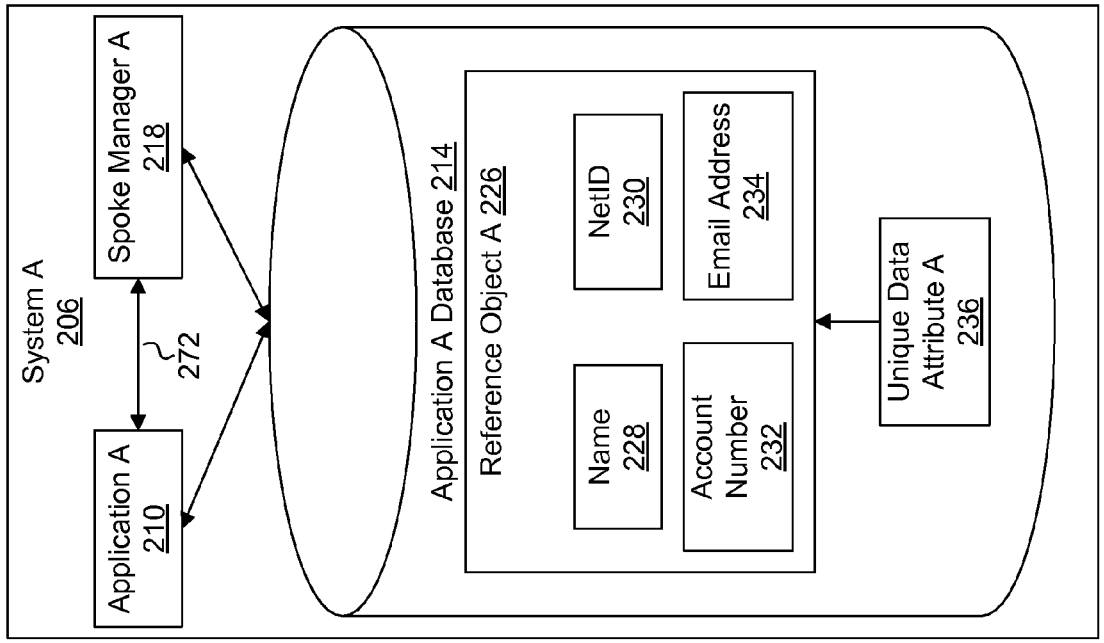
Fig. 2

SYSTEMS AND METHODS FOR NOTIFYING MULTIPLE SYSTEMS AND APPLICATIONS OF CHANGES TO DATA ATTRIBUTES

RELATED APPLICATIONS

This application is related to and claims priority from U.S. patent application Ser. No. 60/827,632 filed Sep. 29, 2006, for PRESENCEID ARCHITECTURE, with inventor Douglas Walker, which is incorporated herein by reference.

TECHNICAL FIELD

The present invention relates generally to computers and computer-related technology. More specifically, the present invention relates to systems and methods for notifying multiple systems and applications of changes to data attributes.

BACKGROUND

Computer and communication technologies continue to advance at a rapid pace. Indeed, computer and communication technologies are involved in many aspects of business operations. For example, a business may be located in numerous places with computers at each location. Computers may allow a business to maintain data relating to the business operations, customers, services, etc. Employees of a business may enter the data into the computers by utilizing business applications that run on the computers. Applications may also allow the employee to manage the data after it has been entered into the computer.

Data stored in a computer or a computer system is typically organized into a file, a database, or another type of data repository. It is not uncommon for an enterprise (e.g., corporation, small business, non-profit institution, government body, etc.) to have data stored in several different types of data repositories. There may be many reasons for this. For example, an enterprise may have inherited some data repositories as a result of mergers, acquisitions or the like with other enterprises. Alternatively, different departments within the same enterprise may have different needs which are best satisfied by different types of computer systems having different types of data repositories. The different data repositories maintained by an enterprise may be located in a variety of different computer systems, which may be dispersed around an office, around a campus, or even around the world.

An employee may utilize an application to enter data relating to the identity of a particular customer. For example, an employee may enter identity data such as the customer's name, date of birth, residential address, business address, network identification, social security number, account numbers, etc. A business may be more efficient by maintaining such identity data. For example, an employee is not required to enter identity data for a particular customer each time the customer interacts with the business because the data is already stored within the computers of the business.

Many businesses maintain many computer systems at various locations. A computer system at one location may differ from a computer system at another location. In particular, application, data and/or databases on one computer system may differ from application, data and/or databases on other computers. Often, data relating to the identity of a particular customer may change. For example, a customer may change residence and the residential address of the customer may need to be updated in the business computers. Because the business applications running on various computers may differ from each other, it may require a substantial amount of time and resources to ensure that changed identity data is updated on each business computer. As such, benefits may be realized by improved systems and methods for notifying multiple systems and applications of changes to data attributes.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 2 is a block diagram illustrating embodiments of databases;

DETAILED DESCRIPTION

Figure 1:
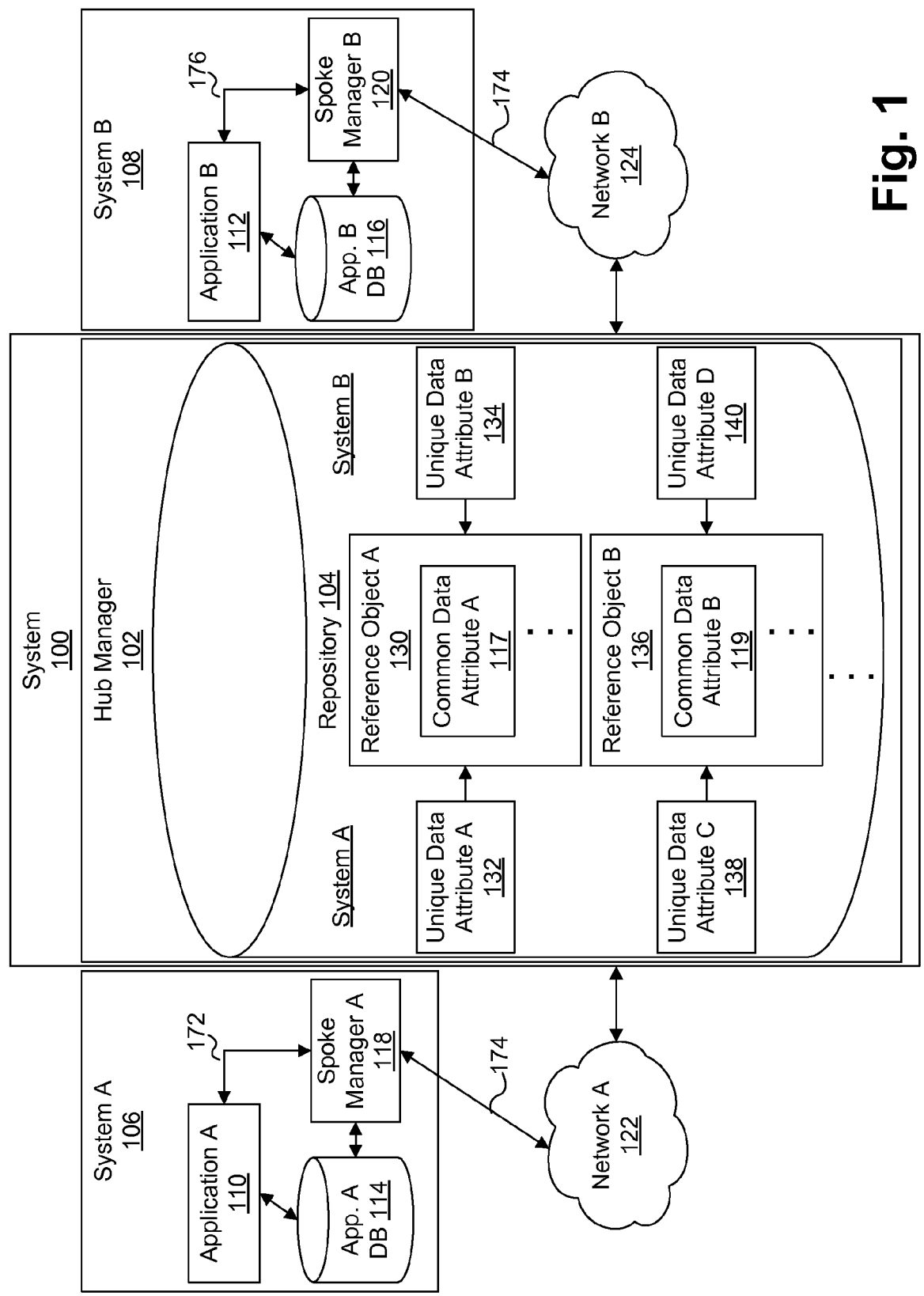
FIG. 1 is a block diagram illustrating one embodiment of a system in communication with a plurality of systems and applications.

A system for managing changes to identity data is described. A first spoke managing system is described which includes a first database, a first application in communication with the first database, and a first spoke manager in communication with the first application. A first message is generated including a plurality of common data attributes. The first message is sent to a hub managing system. The hub managing system includes a hub manager. The hub manager includes a processor and memory in electronic communication with the processor. Instructions are stored in the memory. The first message including the plurality of common data attributes is received from the first spoke managing system. A plurality of common data attributes is updated. A determination is made if a unique data attribute that uniquely identifies a reference object is being updated. A second message is generated based on the determination. A third message is generated based on the updates of the plurality of common data attributes. The second message and third message are sent to one or more spoke managing systems.

In one embodiment, the system includes a second spoke managing system. The second spoke managing system may include a second database, a second application in communication with the second database and a second spoke manager in communication with the second application and the second database. The second spoke manager may be configured to generate a message in a first data format including a plurality of common data attributes and send the message in the first data format to the hub managing system.

The system may further include a plurality of spoke managing systems. The plurality of spoke managing systems include a plurality of databases, a plurality of applications in communication with the plurality of databases and a plurality of spoke managers in communication with the plurality of applications and the plurality of databases. The plurality of spoke managers may be configured to generate a message in a plurality of data formats from the plurality of applications, translate the message into the second data format and send the message in the second data format to the hub managing system.

The first spoke manager may be in communication with the first database. A plurality of common data attributes that are stored in a data repository may be updated. The first message may be generated if a spoke manager detects a queue record stored in a database. The unique data attribute may include data that uniquely identifies a certain entity.

In one embodiment, each of the spoke managing systems within the plurality of spoke managing systems associate a unique data attribute with the reference object. Each of the spoke managing systems within the plurality of spoke managing systems may send the message to the hub managing systems over a unique network connection. Each of the spoke managing systems within the plurality of spoke managing systems may be located in a different geographic region.

A method for managing changes to identity data is also described. A first synchronization message is generated that includes information associated with common data attributes. The message is sent to a hub managing system. The message that includes common data attributes is received. Common data attributes are updated. A determination is made whether a unique data attribute that uniquely identifies a reference object is being updated. A key change message is generated if it is determined that the unique data attribute is being updated. A second synchronization message that comprises information associated with common data attributes is generated. The synchronization message and the key change message are sent to the one or more spoke managers.

In one embodiment, the synchronization message is generated in a first format. The message may be translated into a second format. The synchronization message may be sent in the second format to a hub managing system.

In a further embodiment, a message may be generated in a plurality of formats. The message may be translated into a second format. The message may be sent in the second format to the hub managing system. A spoke manager may generate the first synchronization message if it detects a queue record in a database. The spoke manager may communicate directly with the database. A hub manager may update common data attributes stored in a data repository.

A unique data attribute may include data that uniquely identifies a certain entity. Each of the spoke managing systems within a plurality of spoke managing systems may associate a unique data attribute with the reference object. The first synchronization message may be sent to the hub managing system over a plurality of networks. Each of the spoke managing systems within the plurality of spoke managing systems may be located in a different geographic region.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Most business applications include two general types of data. The first may be transactional data. Examples of transactional data may include orders, shipments, invoices, payments, etc. Transactional data may utilize a high degree of control in order to maintain its integrity. This type of data may be managed by a single, highly integrated application, which may be highly dynamic or attended by a large volume of activity.

The second type of data may include reference data. Examples of reference data may include customers, employees, products, services, accounts, locations, etc. While an important level of control may be utilized in order for reference data to maintain its integrity, it may be common for several business applications in an enterprise to maintain the same reference data. It may be beneficial if this type of data could be created, edited, changed, deleted, etc. by each individual business application in the manner that is was designed to function. Further, it would be beneficial if each individual business application could share common data with the other business applications in the enterprise. For example, it may be beneficial if all of the systems in a business that deal with a certain customer could identify that customer in the same way.

Transactional data may be controlled by tightly-coupled data management techniques. For example, a change to an order amount may occur in the same database transaction that affects the inventory levels of the product. However, tightly-coupled application systems are more expensive to develop and maintain than loosely-coupled application systems.

Reference data generally doesn't require tightly-coupled data management techniques. Instead, this type of data can generally be handled with loosely-coupled data management techniques. A change to an individual's address in one application should be shared with all of the other applications within the business enterprise, but it may be acceptable if it takes several seconds or minutes to synchronize this changed data with the other applications.

The present systems and methods enable a business enterprise to loosely-couple reference data with the multiple business systems, applications and infrastructure. The present systems and methods may loosely-couple reference data with asynchronous messages which may guarantee delivery of the message to each system and application within the business enterprise. For example, the present systems and methods allow an application to complete a change to an attribute associated with reference data and continue the normal operations the application is designed to perform. The present systems and methods may operate in the background and send a message including information about the change to additional systems and applications within the business enterprise. When the additional applications are available, they may accept the message and process the change.

A benefit of the present systems and methods is that if any systems are unavailable for any reason (i.e. off-line) the integrity of the reference data will not be jeopardized. The remaining systems that are available will continue to be synchronized and continue with accurate, updated data attributes.

Current systems and methods generally require data structures of the different applications to be identical or very similar. At the very least, the reference data typically has been required to share a common data attribute that uniquely identifies reference data. Such requirements have not enabled current systems and methods to be sufficiently loosely-coupled. Further, it is expensive for dissimilar applications to share reference data.

FIG. 1 is a block diagram illustrating one embodiment of a system 100 in communication with system A 106 and system B 108. Although FIG. 1 only depicts the system 100 in communication with the two systems 106, 108, it is to be understood that the system 100 may be in communication with more than two systems. For example, numerous systems may be connected in a star configuration with the system 100 at the center. In some embodiments the different systems 100, 106, 108 may be located in different geographic regions across a country and/or across the world. In other embodiments the different systems 100, 106, 108 may be located within the same facility.

System A 106 and system B 108 may include any type of computing device such as a personal computer, laptop, personal digital assistant (PDA), computer server, etc. Systems A and B 106, 108 may include application A 110 and application B 112, respectively. Applications A and B 110, 112 may include software that employs the capabilities of systems A and B 106, 108 to execute a task. In one embodiment, applications A and B 110, 112 may utilize different data structures. Different data structures may be suited to different types of applications, such as applications A and B 110, 112.

Systems A and B 106, 108 may also include application A database 114 and application B database 116, respectively. The databases 114, 116 may include a stored collection of data that may be accessed by applications A and B 110, 112. In one embodiment, systems A and B 106, 108 may also include spoke manager A 118 and spoke manager B 120, respectively. Spoke managers A and B 118, 120 may send/receive data to/from applications A and B 110, 112, respectively. In addition, spoke managers A and B 118, 120 may send/receive data to/from application A database 114 and application B database 116, respectively. In one embodiment, spoke manager A 118 sends/receives data to/from application A 110 in a first format 172. In another embodiment, spoke manager B 120 sends/receives data to/from application B 112 in a second format 176. The first format 172 may be different from the second format 176. Spoke manager A 118 may also send/receive data to/from the system 100. In one embodiment, spoke manager A 118 sends/receives data to/from the system 100 in a third format 174. In another embodiment, spoke manager B 120 also sends/receives data to/from the system 100 in the third format 174.

Spoke managers A and B 118, 120 may communicate with the system 100 over network A 122 and network B 124, respectively. While the illustrated embodiment only illustrates two networks, it is to be understood that the system 100 may communicate with any number of systems over any number of networks. In one embodiment, the system 100 includes a hub manager 102. The hub manager 102 may act as a broker for all the data sent to or received from the various systems and applications. For example, the hub manager 102 may send/receive messages to/from the various systems and applications. In one embodiment, the hub manager 102 may include a repository 104. The repository 104 may store data included within the various systems communicating with the system 100, such as systems A and B 106, 108. In one embodiment, repository 104 may include a plurality of reference objects, such as reference object A 130 and reference object B 136. Reference object A and B 130, 136 may be a record of data relating to the identity of an individual, product, etc. For example, reference object A 130 may be an employee record and reference object B 136 may be a customer record. Each reference object includes common data attributes. Reference object A 130 may include common data attributes A 117 and reference object B 136 may include common data attributes B 119. Common data attributes may include data that is shared between systems, such as system A 106 and system B 108. An example of a common data attribute may include the name of the entity being identified by the reference object. Further examples of common data attributes may include an address, date of birth, email address, etc.

In one embodiment, spoke managers may be deployed to each system and application within a business enterprise. Spoke managers may communicate directly with the hub manager 102 and translate standard messages sent from the hub manager 102 to the system or application. Data translations or data transformations may include data mapping and data formatting. In one embodiment, data mapping identifies the location of specific required data in a table of one system and application and "maps" it to a location of data with the same attributes of another system and application. In one embodiment, data formatting defines a physical format of the data.

Each spoke manager may be very specific to the particular business system or application on which it resides. Including spoke managers with every system and application may allow a business enterprise to scale more easily. For example, the addition of another business application simply means adding a new spoke manager specific to that application. In one embodiment, adding additional systems or applications does not require changes to the hub manager 102 because the spoke manager provides the translation of data formats between the systems and applications and the hub manager 102. In one embodiment, business systems and applications may be deployed on a variety of technology platforms, data management tools and application development environments.

Spoke manager A 118 and spoke manager B 120 may implement a unique data attribute to uniquely identify each reference object. For example, spoke manager A 118 may implement unique data attribute A 132 and spoke manager B 120 may implement unique data attribute B 134 to identify reference object A 130. Similarly, spoke manager A 118 may implement unique data attribute C 138 and spoke manager B 120 may implement unique data attribute D 140 to uniquely identify reference object B 136. In one embodiment, the repository is aware of each unique data attribute and the value of such attribute that each spoke manager implements to identify a particular reference object. The following scenario may further illustrate this concept.

A human resource system of a business may implement the unique data attribute of "Employee_id" to uniquely identify the reference object of an employee record of the employee associated with the employee identification indicated by "Employee_id". An accounting system of the same business may use the unique data attribute of "Employee_tax_id" to uniquely identify the employee record of an employee. For purposes of illustration, the "Employee_id" may be "789" and the "Employee_tax_id" may be "A52". The employee record may include one or more common data attributes, such as name, address, date of birth, etc. In one embodiment, the employee with the "Employee_id" of "789" may change his/her address through an application on the human resource system. The accounting system may not be able to be updated with the new address because the accounting system identifies employee records with a different data attribute (i.e., "Employee_tax_id").

In one embodiment, the repository 104 stores the employee's information such that the hub manager is aware that the employee identification is "789" and the employee tax identification is "A52". The repository 104 may translate a message associated with "Employee_id=789" that is updating a common data attribute to a message that includes "Employee_tax_id=A52" before the message is sent to the accounting system.

In this embodiment, the hub manager 102 is aware of which unique data attribute (and its value) each spoke manager uses to uniquely identify a reference object. The hub manager 102 is also aware of each of the plurality of reference objects that a particular enterprise may use (i.e., employee records, customer records, product record, etc.). Further, the hub manager 102 is aware of each common data attribute included with each reference object. The repository 104 associates each reference object with the unique data attribute each spoke manager uses to uniquely identify the reference object.

FIG. 2 is a block diagram illustrating embodiments of databases. As illustrated, spoke manager A 218 may send/receive data to/from application A 210 using a first data format 272. Spoke manager B 220 may send/receive data to/from application B 212 using a second data format 276. Applications A and B 210, 212 may obtain data from application A database 214 and application B database 216, respectively. In one embodiment, spoke manager A 218 may communicate directly with application A database 214 and spoke manager B 220 may communicate directly with application B database 216.

Application A database 214 and application B database 216 may include one or more reference objects, such as reference object A 226. Reference object A 226 may identify a particular type of entity that is associated with one or more common data attributes. For example, reference object A 226 may identify customers, employees, business entities, products, services, accounts, locations, etc. In one embodiment, reference object A 226 may include common data attributes relating to the entity identified by reference object A 226. In the depicted embodiment, the reference object A 226 identifies a customer and may include common data attributes further relating to the identity of the customer. It is to be understood that additional reference objects may include common data attributes that further relate to the identity of other entities in addition to customers. In one embodiment, reference object A 226 includes common data attributes such as name 228, NetID 230, account number 232 and email address 234. While only four examples of common data attributes are listed, it is to be understood that reference object A 226 may include other common data attributes. For example, common data attributes may include date of birth, residential address, business address, social security number, account numbers, etc.

Spoke manager A 218 and spoke manager B 220 may each uniquely identify the reference object A 226 with a different unique data attribute. For example, spoke manager A 218 may identify reference object A 226 using unique data attribute A 236 while spoke manager B 220 identifies reference object A 226 using unique data attribute B 238.

In addition, application A 210 and application B 212 may use different common data attributes of reference object A 226. For example, application A 210 may use the common attributes of name 228, NetID 230, account number 232 and email address 234. Application may use the common data attributes of data of birth 252, address 254 and telephone number 256.

Figure 3:
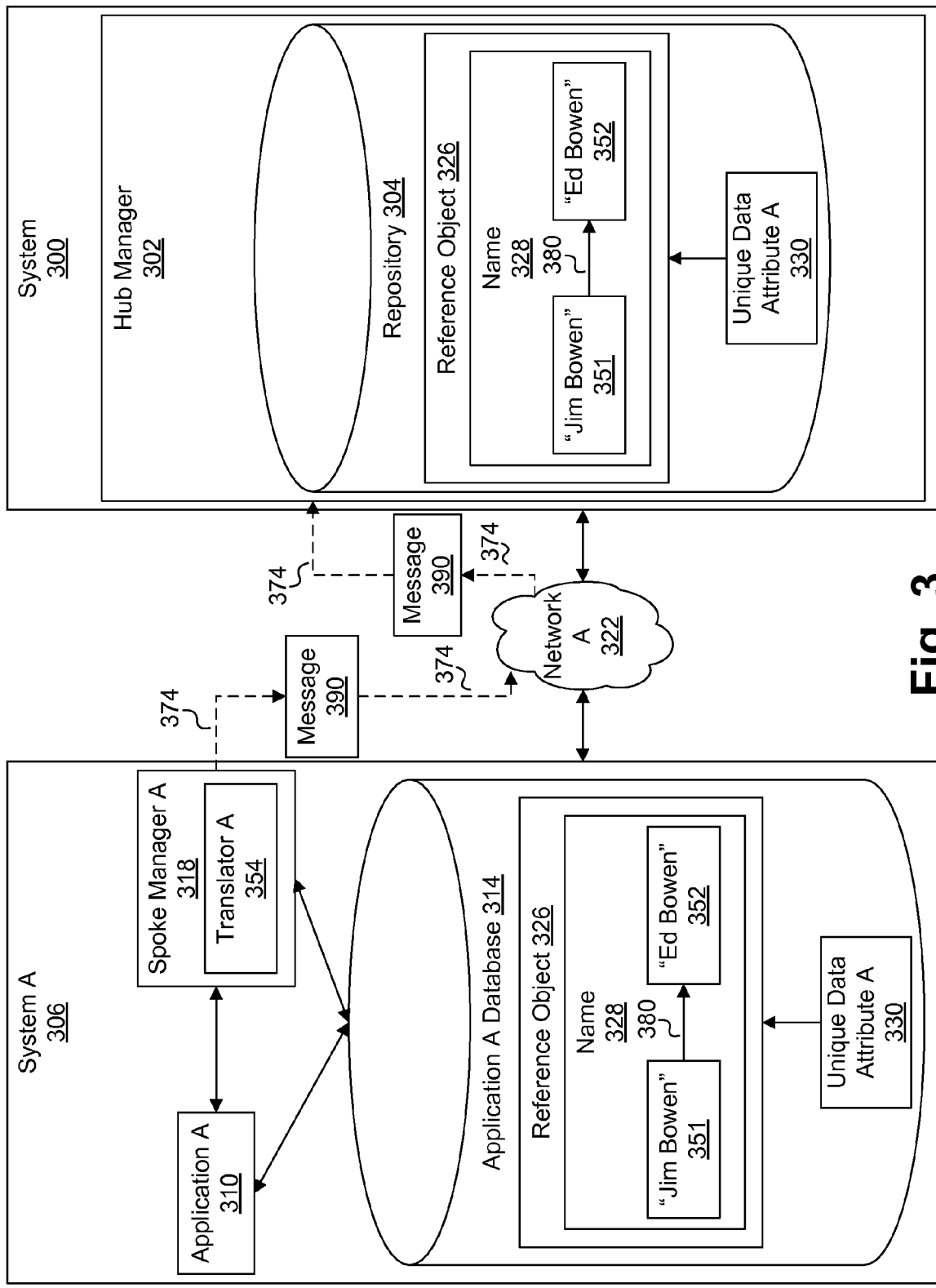
FIG. 3 is a block diagram illustrating one embodiment of spoke manager sending a message to a hub manager.

FIG. 3 is a block diagram illustrating one embodiment of spoke manager A 318 sending a message 390 to a hub manager 302. While only system A 306 is illustrated with spoke manager A 318 communicating with the hub manager 302, it is to be understood that additional systems and spoke managers may communicate with the hub manager 302 in a similar manner as explained below. In one embodiment, system A 306 communicates with a system 300 over network A 322. Application A 310 and spoke manager A 318 may be included within system A 306. In one embodiment, application A 310 facilitates a customer to provide data associated with common data attributes. For example, the customer, using application A 310, may provide the name "Ed Bowen" 352. Application A 310 may communicate the name "Ed Bowen" 352 to application A database 314. Application A database 314 may store the name "Ed Bowen" 352. In one embodiment, the name "Ed Bowen" 352 is associated with the common data attribute of name 328. The name attribute 328, as previously explained, may be included as a common data attribute of reference object 326. In this example, the reference object 326 may be a customer record that identifies a particular customer.

In one embodiment, application A database 314 may have previously stored the name "Jim Bowen" 351. When application A 310 communicates the name "Ed Bowen" 352 to application A database 314, the name "Jim Bowen" 351 may change 380 to the name "Ed Bowen" 352. This scenario may illustrate the situation where the first name entered, "Jim Bowen", was incorrect and should have been "Ed Bowen." In this embodiment, the common data attribute of name 328 is changed.

In one embodiment, spoke manager A 318 may send a message 390 including the change in the common attribute of name 328 to the hub manager 302. In an additional embodiment, the message 390 may include all the common data attributes included with the reference object 326. For example, the reference object 326 may include several common data attributes, such as email, NetID, address etc. A change to any common data attribute, such as the may cause a synchronization message 390 to be sent which includes all of the common data attributes of the reference object 326. In other words, the message 390 may include common data attributes that have not been modified. In the illustrated example, the hub manager 302 detects from the synchronization message that a common data attribute of the reference object 326 has changed.

Spoke manager A 318 may gather all the common data attributes of the reference object 326 and perform data translations if necessary. Spoke manager A 318 may package the message 390 in a first data format 374. In one embodiment, spoke manager A 318 includes translator A 354 which facilitates the translation of the reference object 326 if necessary. The message 390 may be in the form of a simple record that includes unique data attribute A 330. Unique data attribute A 330 may be used by spoke manager A 318 to uniquely identify the reference object 326. Spoke manager A 318 may send the message 390 to the hub manager 302 over network A 322. Changes to common data attributes associated with the reference object 326 may be communicated to the hub manager 302. In a further embodiment, application A 310 updates reference information by writing a queue record in application A database 314. Spoke manager A 318 may monitor the database 314 and take action based on the queue records in the database 314. In another embodiment, application A 310 may not include an application programming interface (API) that spoke manager A 318 may work with. In this instance, spoke manager A 318 may access data directly from application A database 314.

In the illustrated example, the hub manager 302 detects from the synchronization message 390 that a common data attribute of the reference object 326 has changed. In one embodiment, the hub manager 302 may define a packet of information for the reference object 326 which includes all the common data attributes of the reference object 326. The packet of information included in the hub manager 302 may be a superset of data from each system and application including the reference object 326. In one embodiment, the hub manager 302 maintains a repository 304 with the reference object 326 and each of the common data attributes of the reference object 326. In addition, as previously explained, the repository 304 includes which unique data attribute each spoke manager of various system uses to unique identify the reference object 326.

In one embodiment, the hub manager 302 may receive the message 390 which includes unique data attribute A 330. The hub manager 302 is aware that spoke manager A 318 uses unique data attribute A 330 to identify the reference object 326. The hub manager 302 may processes the message 390 in order to update the common data attributes associated with the reference object 326 stored in the repository 304. For example, the common data attribute of name 328 is changed 380 from "Jim Bowen" 351 to "Ed Bowen" 352.

Figure 4:
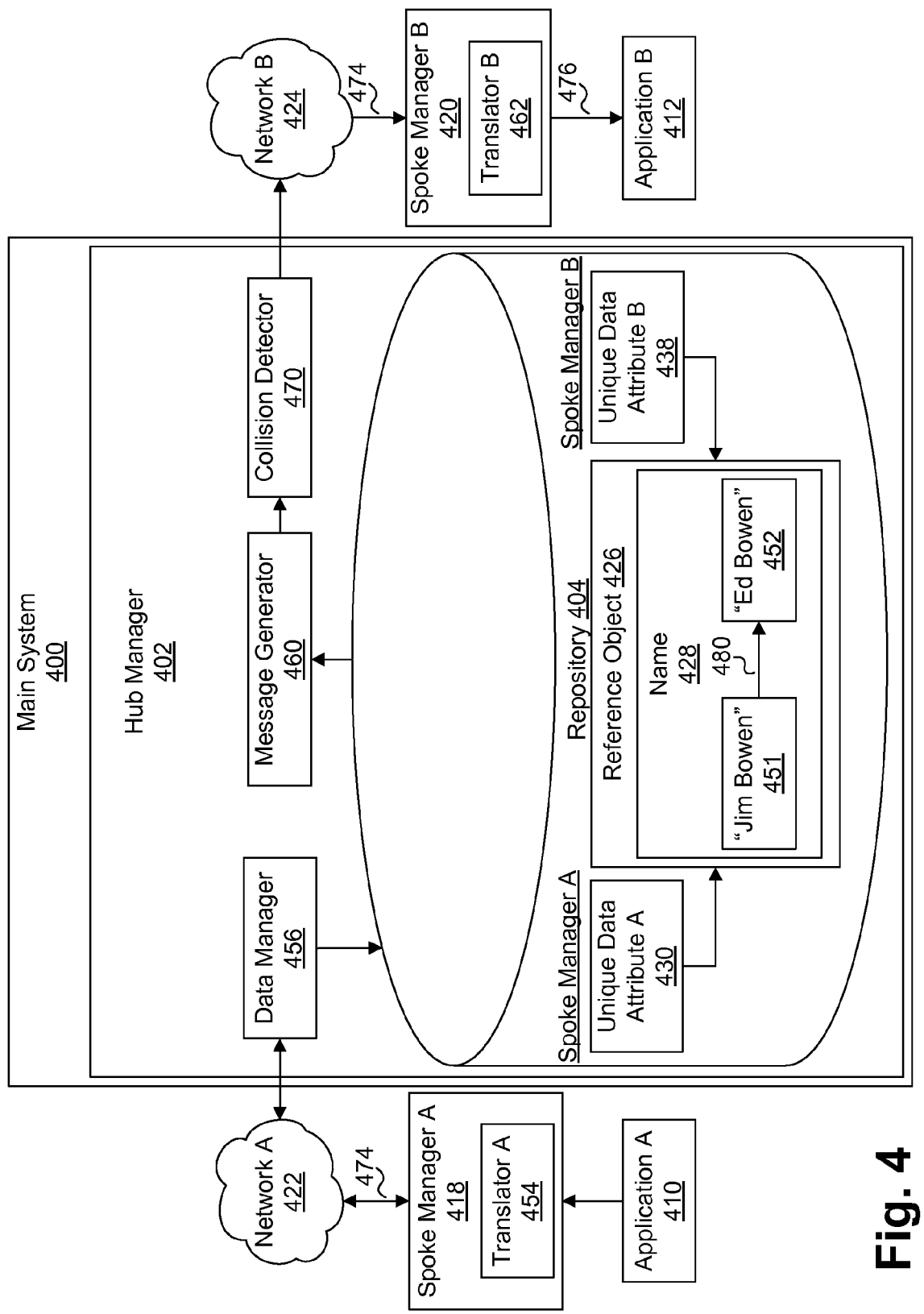
FIG. 4 is a block diagram illustrating one embodiment of a hub manager sending a synchronization message to additional applications.

FIG. 4 is a block diagram illustrating one embodiment of a hub manager 402 sending a synchronization message to additional spoke managers. In one embodiment, spoke manager A 418 may build a message in a first data format 474. Translator A 454 may be used to format the message in the first data format 474. In other words, each spoke manager sends/receives messages to/from the hub manager 402 in a single format per reference object. The message may include all the common data attributes associated with the reference object stored in application A database (not shown). The first data format 474 indicates the unique data attribute being used by spoke manager A to uniquely identify the reference object 426.

Spoke manager A 418 may send the message in the first data format 474 to a data manager 456 over network A 422. In one embodiment, the data manager 456 is included within a hub manager 402. In one embodiment, spoke manager A 418 may require additional information in order to build the message. Additional information may be retrieved from the hub manager 402 in order to build a complete message. For example, the additional information may be retrieved through synchronous web services messages. In one embodiment, the data manager 456 receives requests from spoke manager A 418 for the web services.

The hub manager 402 processes the message and determines which reference object is identified from the unique data attribute included in the message. In this example, the message includes unique data attribute A 430 which identifies the reference object 426. In one embodiment, the common data attribute of name 428 included in the reference object 426 is changed 480 from "Jim Bowen" 451 to "Ed Bowen" 452. The reference object 426 stored in the repository 404 may be updated with the changed common data attribute included in the message.

A message generator 460 may generate a synchronization message that includes updates to any of the common data attributes of the reference object 426. A collision detector 470 may be used before the hub manager sends synchronization messages to other spoke systems to notify them of any updates to common data attributes. The collision detector 470 detects the most recent synchronization message for a given reference object and only allows the most current messages generated by the message generator 460 to be sent to additional spoke managers. Collision detection occurs when a particular spoke system is synchronized on a scheduled time interval as opposed to an on-demand synchronization. In one embodiment, the hub manager 402 is aware which spoke managers are configured for a scheduled synchronization and when that is to occur. Synchronization messages may be placed in a cue between scheduled synchronization events and only the most recent messages are sent and the others are discarded at that time. The collision detector 470 verifies that only the most accurate common data attributes are included on each reference object in every spoke system that needs that particular common data attribute.

The synchronization message may be sent to application B 412, through spoke manager B 420. Because the hub manager 402 is aware that spoke manager B 420 uses unique data attribute B 438 to identify reference object 426, the message may include unique data attribute B 438. Spoke manager B 420 may receive the message in the first data format 474 (with unique data attribute B 438). In one embodiment, translator B 462 translates the message to a suitable format that may be used by application B 412 or application B database. In one embodiment, the message may be a series of messages/requests depending on the API of application B 412. Spoke manager B 420 may communicate directly with application B database if application B 412 does not allow a public API. Spoke manager B 420 translates the message, becomes aware that the message pertains to common data attributes of the reference object 426 (because of unique data attribute B 438). The message includes all the common data attributes associated with the reference object 426. Spoke manager B 420 determines which common data attributes are applicable to the reference object used by application B 412. In other words, spoke manager B 420 may ignore some of the common data attributes in the message if they do not pertain to application B.

In some embodiments, a unique data attribute may be changed. For example, referring to the previous example, the human resource system may change the employee tax identification for an employee from "A52" to "B46". In this example, the "Employee_tax_id" is used by the spoke manager B 420 to uniquely identify the employee record. The hub manager 402 may generate a key change message if the unique data attribute used by another spoke manger is altered.

Figure 5:
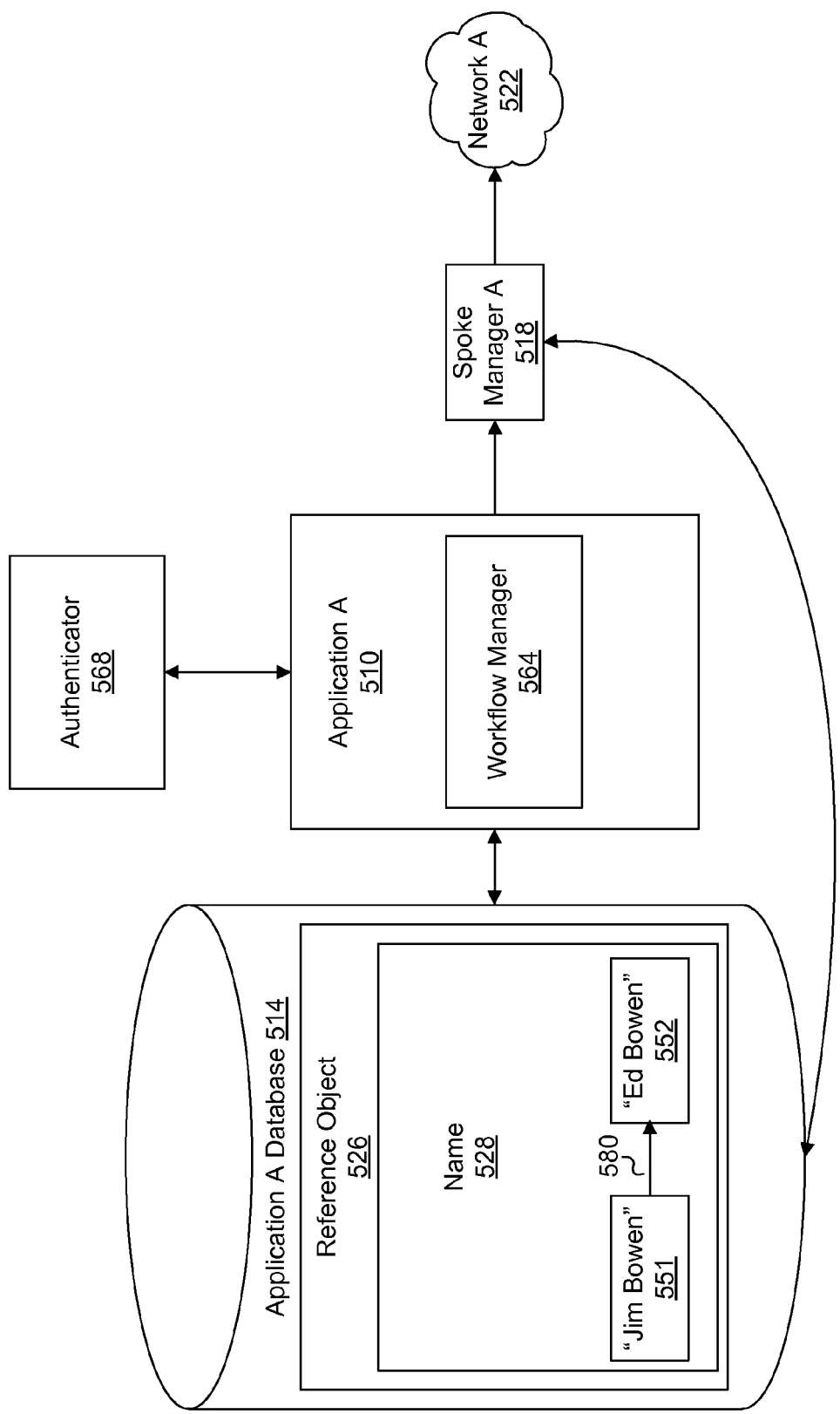
FIG. 5 is a block diagram illustrating one embodiment of a potential change in a common data attribute being authenticated.

FIG. 5 is a block diagram illustrating one embodiment of a potential change in a common data attribute being authenticated. Application A database 514 may include reference object 526 as previously explained. In one embodiment, the common data attribute of name 528 may be changed 580 from "Jim Bowen" 551 to "Ed Bowen" 552.

In one embodiment, application A 510 may access application A database 514 and store a queue record if changes to common data attributes have occurred. Application A 510, and the system including application A 510 (such as system A 106), may include native built-in workflow capabilities. In one embodiment, application A 510 may include a workflow manager 564 to manage these workflow capabilities. Spoke manager A 518 may monitor application A database 514 for a queue record. If a queue record is detected by spoke manager A 518, spoke manager A 518 may package a synchronization message that includes all of the common data attributes of the reference object 526 and sends the message to a hub manager. In a further embodiment, spoke manager A 518 may gather all the common data attributes of the reference object by making requests of application A 510 through an API or by accessing application A database 514 directly if there is no API available.

In one embodiment, a notification may be communicated to an authenticator 568 when a queue record is stored in application A database 514. The authenticator 568 may include a system administrator who may accept or reject the storage of the queue record. In another embodiment, the authenticator 568 may include computer software that automatically accepts or rejects the queue record according to certain parameters determined by the system administrator. For example, the system administrator may program the software to accept changes relating to the common data attribute of name 528 and reject changes the account number common data attribute 232. If the queue record is rejected, spoke manager A 518 does not build a message to send to a hub manager over network A 522.

Figure 6:
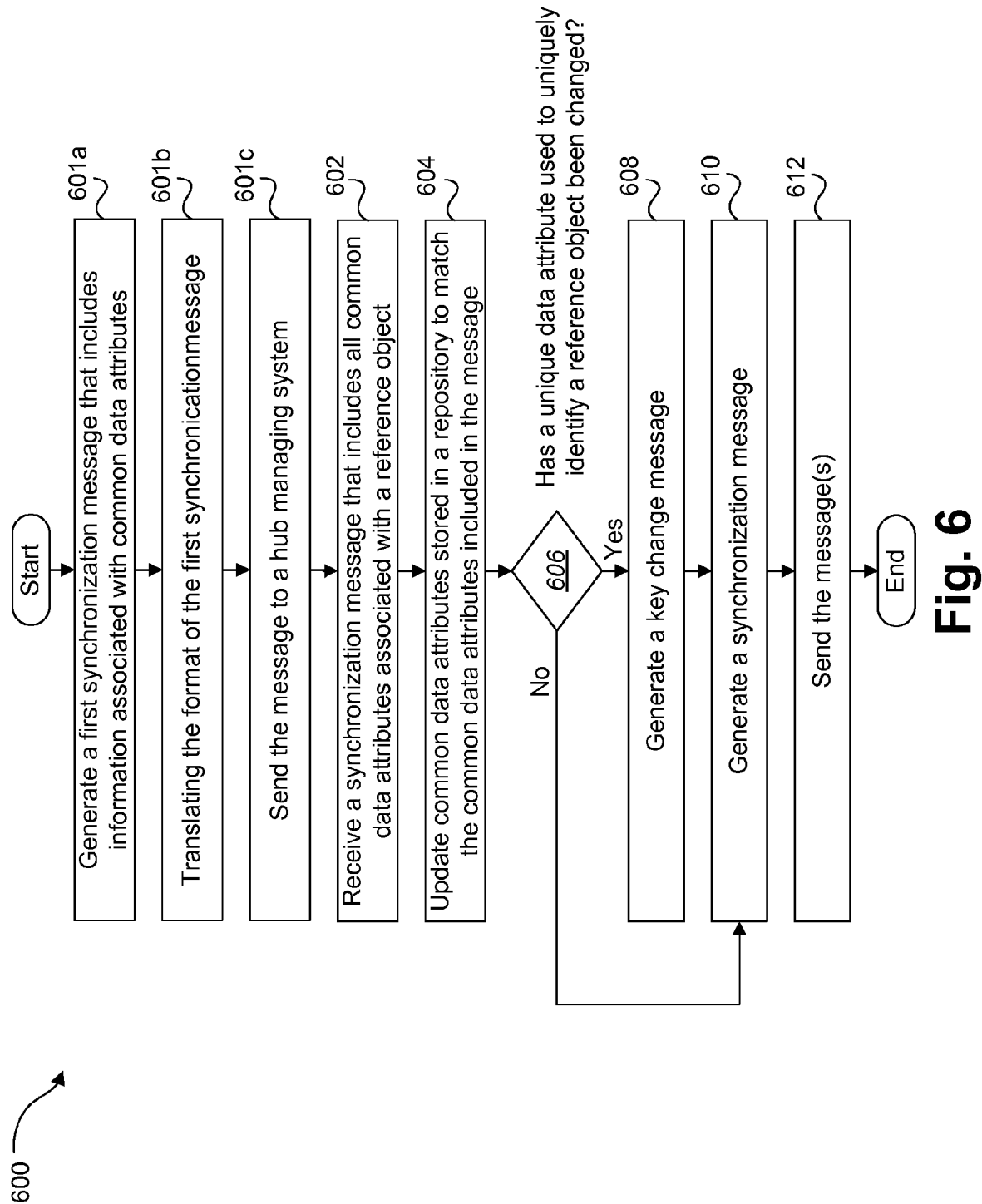
FIG. 6 is a flow diagram illustrating one embodiment of a method for notifying multiple systems and applications of changes to a common data attribute.

FIG. 6 is a flow diagram illustrating one embodiment of a method 600 for notifying multiple systems and applications of changes to common data attributes. In one embodiment, the method 600 may be implemented by the hub manager 102. A first synchronization message may be generated 601a that includes information associated with common data attributes. This message may be translated 601c into a different format. This message is sent 601b to the hub managing system. A synchronization message that includes all common data attributes of a reference object may be received 602. In one embodiment, the data manager 456 receives 602 the message. Common data attributes that may be stored in a repository of the hub manager may be updated 604 to be in synchronization with the common data attributes included in the message. A determination 606 is made as to whether a unique data attribute used by a spoke manager to uniquely identify a reference object has been changed. If it is determined 606 that a unique data attribute is being updated, a key change message may be generated 608. In one embodiment, the key change message is queued up and addressed to the spoke manager(s) that use the unique data attribute to identify the reference object. If it is determined 606 that there is no unique data attribute being updated, a synchronization message may be generated 610. The synchronization message (and possibly the key change message) may be sent 612 to one or more spoke systems.

The message may include all the common data attributes associated with the reference object. The message may also include the unique data attribute used by the receiving spoke manager to uniquely identify the reference object. In one embodiment, the receiving spoke manager has sufficient contextual information to translate for differences in data structures, keys, application technologies and business rules. In a further embodiment, the receiving spoke manager may translate any differences and synchronize the data with its internal data structures.

Figure 7:
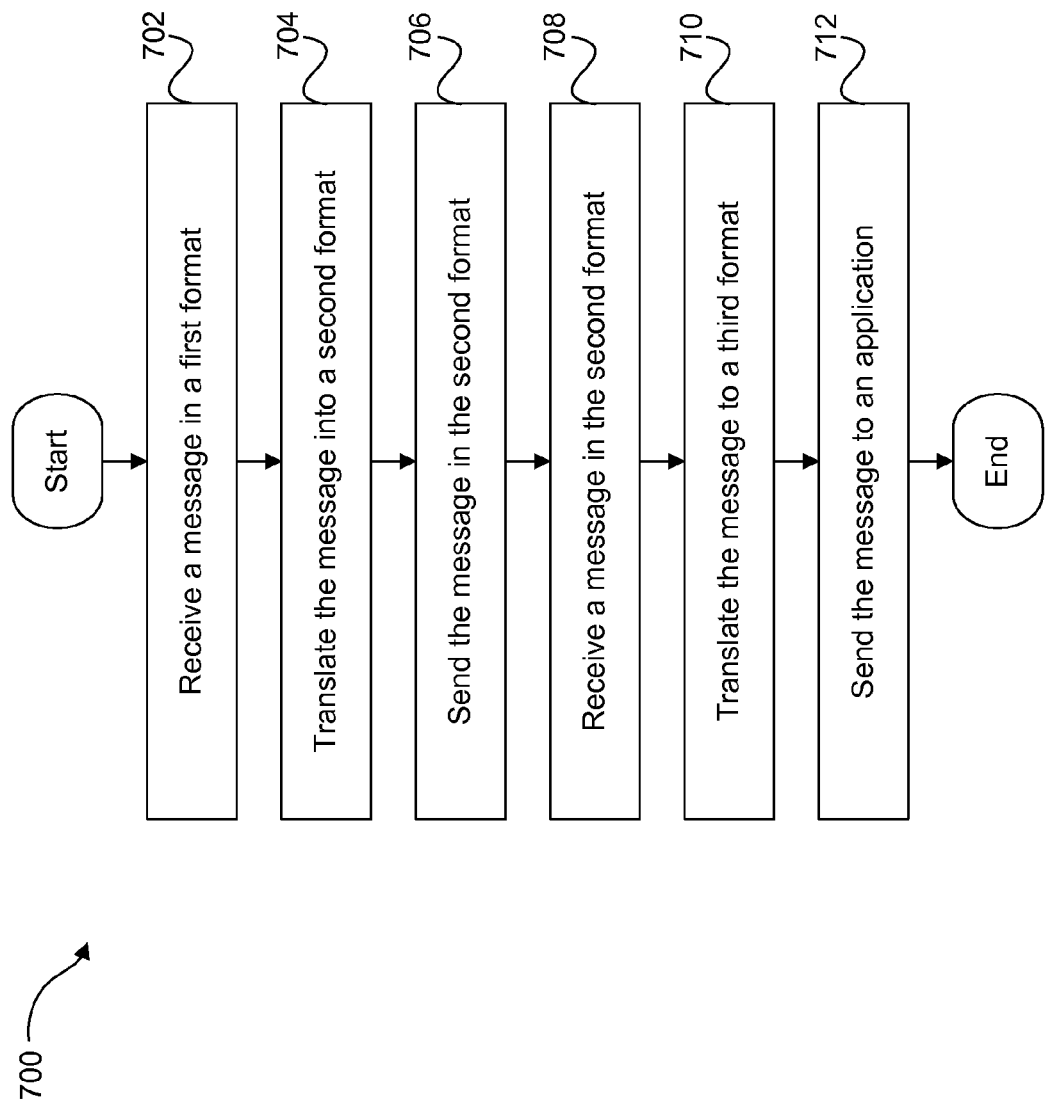
FIG. 7 is a flow diagram illustrating one embodiment of a method for translating a data packet into a specific data format.

FIG. 7 is a flow diagram illustrating one embodiment of a method 700 for translating a message into a specific format. In one embodiment, a spoke manager may implement the method 700. The message may be received 702 in a first format. In one embodiment, the first format may be a format specific to a particular system or application. The message may be translated 704 into a second format. In one embodiment, a translator included in the spoke manager may translate 704 the message into the second format. The message may be sent 706 in the second format. In one embodiment, the message may be sent to the hub manager 102 in the second format. The second format may include a format specific to the hub manager 102.

In one embodiment, a message may be received 708 in the second format. In one embodiment, the message may be received 708 from the hub manager 102. The message may be translated 710 to a third format. In one embodiment, the third format may be a format specific to a particular system and application. The message may be sent 712 to the system and application that is specific to the third format.

Figure 8:
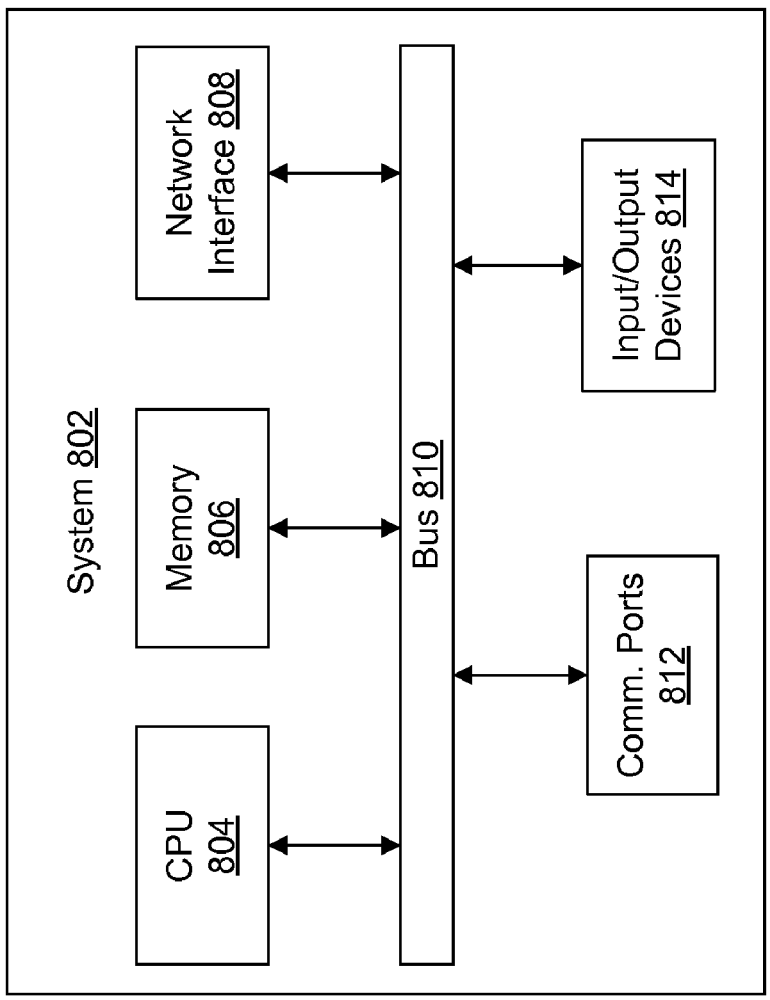
FIG. 8 is a block diagram of hardware components that may be used in an embedded device that is configured according to an embodiment.

FIG. 8 is a block diagram of hardware components that may be used in a system 802 that is configured according to an embodiment. A central processing unit (CPU) 804 or processor may be provided to control the operation of the system 802, including the other components thereof, which are coupled to the CPU 804 via a bus 810. The CPU 804 may be embodied as a microprocessor, microcontroller, digital signal processor or other device known in the art. The CPU 804 performs logical and arithmetic operations based on program code stored within the memory. In certain embodiments, the memory 806 may be on-board memory included with the CPU 804. For example, microcontrollers often include a certain amount of on-board memory.

The system 802 may also include a network interface 808. The network interface 808 facilitates communication between the system 802 and other devices connected to a network, which may be a pager network, a cellular network, a global communications network, the Internet, a computer network, a telephone network, etc. The network interface 808 operates according to standard protocols for the applicable network.

The system 802 may also include memory 806. The memory 806 may include random access memory (RAM) for storing temporary data. Alternatively, or in addition, the memory 806 may include read-only memory (ROM) for storing more permanent data, such as fixed code and configuration data. The memory 806 may also be embodied as a magnetic storage device, such as a hard disk drive. The memory 806 may be any type of electronic device capable of storing electronic information.

The system 802 may also include one or more communication ports 812, which facilitate communication with other devices. The system 802 may also include input/output devices 814, such as a keyboard, a mouse, a joystick, a touchscreen, a monitor, speakers, a printer, etc.

Of course, FIG. 8 illustrates only one possible configuration of a system 802. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for managing changes to identity data, the system comprising:
   a first spoke managing system, wherein the first spoke managing system comprises:
   a first database comprising a plurality of reference objects, wherein each reference object includes data attributes related to the reference object;
   a first application in communication with the first database; and
   a first spoke manager in communication with the first application, the first spoke manager being configured to:
   generate a first synchronization message in a first data format readable by the first spoke manager including a plurality of one or more common data attributes and a first unique data attribute, wherein the first unique data attribute is a data attribute used by the first spoke manager to identify a particular reference object in the first database, wherein the one or more common data attributes are data attributes not used by the first spoke manager to identify a particular reference object;
   translate the first synchronization message into a second data format, the second data format being different than the first data format, the second data format being readable by a hub managing system; and
   send the first synchronization message to the hub managing system;
   wherein the hub managing system comprises:
   a hub manager, wherein the hub manager comprises:
   a processor;
   memory in electronic communication with the processor; and
   instructions stored in the memory, the instructions being executable to:
   receive the first synchronization message including the one or more common data attributes and the first unique data attribute from the first spoke managing system;
   update a plurality of data attributes stored in a repository based upon the one or more common data attributes and the first unique data attribute received in the first synchronization message;
   determine whether one of the data attributes stored in the repository that is being updated is a second unique data attribute that is used by a second spoke managing system to uniquely identify the particular reference object in a second database, the second database being part of the second spoke managing system, the second spoke managing system further comprising a second spoke manager, wherein at least one of the data attributes in the second database is different than at least one of the data attributes in the first database, wherein the second unique data attribute is different than the first unique data attribute, wherein the hub manager stores which of the data attributes stored in the repository constitutes the first unique data attribute and which of the data attributes stored in the repository constitutes the second data attribute;

generate a key change message when the second unique data attribute is being updated, wherein the key change message includes an update to the second unique data attribute;

generate a second synchronization message based on the updates of the plurality of data attributes stored in the repository;

send the key change message to the second spoke managing system when the key change message is generated; and send the second synchronization message to the second spoke managing system, wherein the second synchronization message comprises the second unique data attribute, updated data attributes stored in the repository as well as any data attributes stored in the repository that were not updated, wherein the second spoke managing system determines which of the data attributes are applicable and ignores any remaining data attributes that are not applicable.

2. The system of claim 1, wherein the second spoke managing system further comprises:
a second application in communication with the second database, wherein the second spoke manager is in communication with the second application; and
wherein the second spoke manager is configured to:
generate a message in a data format that is readable by the hub managing system, the message including a plurality of data attributes; and
send the message to the hub managing system.

3. The system of claim 1, further comprising:
one or more additional second spoke managing systems, wherein each of the additional second spoke managing systems comprise:
a database;
an application in communication with the database; and
a spoke manager in communication with the application and the database, each of the additional second spoke managers being configured to:
generate a message in a data format from the application;
translate the message into a different data format; and
send the message in the different data format to the hub managing system.

4. The system of claim 1, wherein the first spoke manager is in communication with the first database.

5. The system of claim 1, wherein the first synchronization message is generated if a spoke manager detects a queue record stored in a database.

6. The system of claim 1, wherein the first unique data attribute includes data that uniquely identifies a certain entity.

7. The system of claim 3, wherein each of the one or more additional second spoke managing systems associates a unique data attribute with the reference object.

8. The system of claim 3, wherein each of the one or more additional second spoke managing systems sends the message to the hub managing system over a unique network connection.

9. The system of claim 3, wherein each of the one or more additional spoke managing systems is located in a different geographic region.

10. A method for managing changes to identity data, the method comprising:
generating, by a first spoke manager, a first synchronization message in a first format readable by the first spoke manager, wherein the first spoke manager is in communication with a first application and a first database, wherein the first database comprises a plurality of reference objects, wherein each reference object includes data attributes related to the reference object, wherein the first synchronization message one or more common data attributes and a first unique data attribute, wherein the first unique data attribute is a data attribute used by the first spoke manager to identify a particular reference object in the first database, wherein the one or more common data attributes are data attributes not used by the first spoke manager to identify a particular reference object;

translating the first synchronization message into a second format, the second data format being different than the first data format, the second data format being readable by a hub managing system;

sending the first synchronization message in the second format to the hub managing system;

receiving the first synchronization message that includes the one or more common data attributes and the first unique data attribute at the hub managing system;

updating a plurality of data attributes stored in a repository based upon the one or more data common attributes and the first unique data attribute received in the first synchronization message;

determining whether one of the data attributes stored in the repository that is being updated is a second unique data attribute that is used by a second spoke managing system to uniquely identify the particular reference object in a second database, the second database being part of the second spoke managing system, the second spoke managing system further comprising a second spoke manager, wherein at least one of the data attributes in the second database is different than at least one of the data attributes in the first database, wherein the second unique data attribute is different than the first unique data attribute, wherein the hub manager stores which of the data attributes stored in the repository constitutes the first unique data attribute and which of the data attributes stored in the repository constitutes the second data attribute;

generating a key change message when it is determined that the second unique data attribute is being updated, wherein the key change message includes an update to the second unique data attribute;

generating a second synchronization message based on the updates of the plurality of data attributes stored in the repository;

sending the key change message to the second spoke manager when the key change message is generated; and sending the second synchronization message to the second spoke manager, wherein the second synchronization message comprises the second unique data attribute, updated data attributes stored in the repository as well as any data attributes stored in the repository that were not updated, wherein the second spoke managing system determines which of the data attributes are applicable and ignores any remaining data attributes that are not applicable.

11. The method of claim 10, wherein the first spoke manager generates the first synchronization message if it detects a queue record in a database.

12. The method of claim 10, wherein a first unique data attribute includes data that uniquely identifies a certain entity.

13. The method of claim 10, further comprising one or more additional second spoke managing systems, wherein each of the additional second spoke managing systems associate a unique data attribute with the reference object.

14. The method of claim 10, wherein the first synchronization message is sent to the hub managing system over a networks.

15. The method of claim 13, wherein each of the additional second spoke managing systems is located in a different geographic region.

16. The system of claim 1, wherein if the second spoke manager is unavailable to receive the second synchronization message, the hub managing system delays the sending of the second synchronization message until the second spoke managing system is available.

* * * * *

UNITED STATES PATENT AND TRADEMARK OFFICE
CERTIFICATE OF CORRECTION

| | | |
|---|---|---|
| PATENT NO. | : 7,865,464 B2 | Page 1 of 1 |
| APPLICATION NO. | : 11/833857 | |
| DATED | : January 4, 2011 | |
| INVENTOR(S) | : Douglas Jock Walker | |

It is certified that error appears in the above-identified patent and that said Letters Patent is hereby corrected as shown below:

In column 14, lines 33-34 please delete "a plurality of".
In column 18, lines 2-3 please delete "over a networks" and replace it with --over a plurality of networks--.

Signed and Sealed this
Seventeenth Day of May, 2011

David J. Kappos
*Director of the United States Patent and Trademark Office*